United States Patent
Prasad Challa et al.

(10) Patent No.: US 12,286,154 B2
(45) Date of Patent: *Apr. 29, 2025

(54) VEHICULAR CONTROL SYSTEM WITH AUTONOMOUS BRAKING

(71) Applicant: Magna Electronics Inc., Auburn Hills, MI (US)

(72) Inventors: Venkata Satya Siva Prasad Challa, Troy, MI (US); Nikunj Vinubhai Kumbhani, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,667

(22) Filed: Apr. 22, 2024

(65) Prior Publication Data

US 2024/0270312 A1  Aug. 15, 2024

Related U.S. Application Data

(63) Continuation of application No. 17/445,200, filed on Aug. 17, 2021, now Pat. No. 11,964,691.
(Continued)

(51) Int. Cl.
*B62D 15/02* (2006.01)
*B60W 30/09* (2012.01)
(Continued)

(52) U.S. Cl.
CPC .......... *B62D 15/025* (2013.01); *B60W 30/09* (2013.01); *B60W 30/0953* (2013.01);
(Continued)

(58) Field of Classification Search
CPC ... B60W 2050/0292; B60W 2050/146; B60W 2420/403; B60W 2420/408;
(Continued)

(56) References Cited

U.S. PATENT DOCUMENTS

| 5,550,677 A |   | 8/1996 | Schofield et al. |
|---|---|---|---|
| 5,670,935 A | * | 9/1997 | Schofield ............... G01J 1/4228 |
|   |   |   | 348/E7.086 |

(Continued)

OTHER PUBLICATIONS

Snider J.M., "Automatic Steering Methods for Autonomous Automobile Path Tracking", Feb. 2009, CMU thesis.
(Continued)

*Primary Examiner* — Babar Sarwar
(74) *Attorney, Agent, or Firm* — HONIGMAN LLP

(57) ABSTRACT

A vehicular control system includes a camera and a radar sensor disposed at an equipped vehicle. The system, via processing of image data and processing of sensor data, determines other vehicles present on the road ahead of the equipped vehicle. The system, responsive to determining the presence of a plurality of other vehicles present on the road, determines a threat level for each vehicle of the plurality of other vehicles. An emergency braking system of the equipped vehicle is controlled responsive to the determined threat levels. When a vehicle of the plurality of other vehicles is no longer detectable via processing of image data captured by the camera and processing of sensor data captured by the radar sensor, the system predicts a position for the no longer detectable vehicle of the plurality of other vehicles.

20 Claims, 2 Drawing Sheets

Related U.S. Application Data

(60) Provisional application No. 62/706,438, filed on Aug. 17, 2020.

(51) Int. Cl.

| | | |
|---|---|---|
| *B60W 30/095* | (2012.01) | |
| *B60W 30/10* | (2006.01) | |
| *B60W 30/18* | (2012.01) | |
| *B60W 40/04* | (2006.01) | |
| *B60W 50/029* | (2012.01) | |
| *B60W 50/14* | (2020.01) | |
| *G06F 18/25* | (2023.01) | |
| *G06T 7/70* | (2017.01) | |
| *G06V 20/58* | (2022.01) | |

(52) U.S. Cl.
CPC ...... *B60W 30/10* (2013.01); *B60W 30/18018* (2013.01); *B60W 30/18159* (2020.02); *B60W 40/04* (2013.01); *B60W 50/029* (2013.01); *B60W 50/14* (2013.01); *G06F 18/25* (2023.01); *G06T 7/70* (2017.01); *G06V 20/584* (2022.01); *B60W 2050/0292* (2013.01); *B60W 2050/146* (2013.01); *B60W 2420/403* (2013.01); *B60W 2420/408* (2024.01); *B60W 2552/53* (2020.02); *B60W 2554/402* (2020.02); *B60W 2554/404* (2020.02); *B60W 2554/4041* (2020.02); *B60W 2554/80* (2020.02); *G06T 2207/30236* (2013.01); *G06T 2207/30256* (2013.01)

(58) Field of Classification Search
CPC ....... B60W 2520/125; B60W 2552/15; B60W 2552/53; B60W 2554/402; B60W 2554/404; B60W 2554/4041; B60W 2554/4042; B60W 2554/80; B60W 2754/30; B60W 30/09; B60W 30/0953; B60W 30/0956; B60W 30/10; B60W 30/12; B60W 30/16; B60W 30/18018; B60W 30/18159; B60W 40/04; B60W 50/029; B60W 50/14; B62D 15/025; B62D 15/026; G06F 18/25; G06T 2207/30236; G06T 2207/30256; G06T 2207/30261; G06T 7/70; G06V 20/58; G06V 20/584; G06V 20/588
See application file for complete search history.

(56) References Cited

U.S. PATENT DOCUMENTS

| | | | |
|---|---|---|---|
| 5,949,331 A * | 9/1999 | Schofield | B60Q 1/1423 |
| | | | 348/E7.086 |
| 6,690,268 B2 | 2/2004 | Schofield et al. | |
| 6,824,281 B2 | 11/2004 | Schofield et al. | |
| 7,038,577 B2 | 5/2006 | Pawlicki et al. | |
| 7,205,904 B2 * | 4/2007 | Schofield | G06F 18/24 |
| | | | 340/937 |
| 7,480,149 B2 | 1/2009 | DeWard et al. | |
| 7,720,580 B2 | 5/2010 | Higgins-Luthman | |
| 7,855,755 B2 | 12/2010 | Weller et al. | |
| 8,256,821 B2 | 9/2012 | Lawlor et al. | |
| 9,180,908 B2 | 11/2015 | Van Dan Elzen et al. | |
| 9,487,159 B2 | 11/2016 | Achenbach | |
| 9,596,387 B2 | 3/2017 | Achenbach et al. | |
| 9,871,971 B2 | 1/2018 | Wang et al. | |
| 9,896,039 B2 | 2/2018 | Achenbach et al. | |
| 9,988,047 B2 | 6/2018 | Johnson et al. | |
| 10,032,369 B2 | 7/2018 | Koravadi | |
| 10,055,651 B2 | 8/2018 | Chundrlik, Jr. et al. | |
| 10,071,687 B2 | 9/2018 | Ihlenburg et al. | |
| 10,099,614 B2 | 10/2018 | Diessner | |
| 10,214,157 B2 * | 2/2019 | Achenbach | H04N 7/181 |
| 10,222,224 B2 * | 3/2019 | Johnson | G08G 1/205 |
| 10,268,904 B2 | 4/2019 | Gupta | |
| 10,315,651 B2 | 6/2019 | Fiaschetti et al. | |
| 10,406,981 B2 * | 9/2019 | Chundrlik, Jr. | G01S 19/39 |
| 10,449,899 B2 | 10/2019 | Gupta et al. | |
| 10,457,209 B2 * | 10/2019 | Byrne | G06T 3/08 |
| 10,787,125 B2 * | 9/2020 | Achenbach | H04N 23/54 |
| 10,812,992 B1 * | 10/2020 | Tran | H04B 7/0695 |
| 11,017,665 B1 * | 5/2021 | Roy | G08G 1/14 |
| 11,763,410 B1 * | 9/2023 | Roy | H04L 9/40 |
| | | | 701/117 |
| 11,964,691 B2 | 4/2024 | Prasad Challa et al. | |
| 2005/0179527 A1 * | 8/2005 | Schofield | B60Q 9/008 |
| | | | 348/148 |
| 2008/0192984 A1 * | 8/2008 | Higuchi | G06V 20/56 |
| | | | 382/104 |
| 2009/0295181 A1 | 12/2009 | Lawlor et al. | |
| 2013/0297387 A1 * | 11/2013 | Michael | G06Q 30/02 |
| | | | 705/13 |
| 2014/0160284 A1 | 6/2014 | Achenbach et al. | |
| 2014/0226012 A1 | 8/2014 | Achenbach | |
| 2015/0015713 A1 | 1/2015 | Wang et al. | |
| 2015/0327398 A1 | 11/2015 | Achenbach et al. | |
| 2016/0159394 A1 * | 6/2016 | Ryu | B60W 30/12 |
| | | | 701/41 |
| 2018/0173239 A1 * | 6/2018 | Yoon | G01S 17/89 |
| 2020/0327343 A1 * | 10/2020 | Lund | H04W 4/46 |
| 2021/0061276 A1 * | 3/2021 | Zhang | B60W 10/18 |
| 2021/0221390 A1 * | 7/2021 | Slobodyanyuk | G01S 7/40 |
| 2021/0385865 A1 * | 12/2021 | Mueck | H04W 80/02 |
| 2021/0392454 A1 * | 12/2021 | Choi | B60W 40/105 |
| 2022/0024485 A1 * | 1/2022 | Theverapperuma | G06V 20/58 |
| 2022/0048504 A1 | 2/2022 | Prasad Challa et al. | |
| 2022/0048509 A1 | 2/2022 | Prasad Challa | |
| 2022/0048566 A1 | 2/2022 | Prasad Challa et al. | |
| 2022/0097625 A1 * | 3/2022 | Russell | B60R 1/12 |
| 2022/0255223 A1 * | 8/2022 | Tran | H04W 4/40 |

OTHER PUBLICATIONS

Werling et al., Invariant Trajectory Tracking With a Full-Size Autonomous Road Vehicle, IEEE, vol. 26, No. 4, Aug. 2010.

Werling et al., Optimal trajectories for time-critical street scenarios using discretized terminal manifolds, The International Journal of Robotics Research, Mar. 2012.

* cited by examiner

VEHICULAR CONTROL SYSTEM WITH AUTONOMOUS BRAKING

CROSS REFERENCE TO RELATED APPLICATIONS

The present application is a continuation of U.S. patent application Ser. No. 17/445,200, filed Aug. 17, 2021, now U.S. Pat. No. 11,964,691, which claims the filing benefits of U.S. provisional application Ser. No. 62/706,438, filed Aug. 17, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that includes a camera disposed at a vehicle equipped with the vehicular control system and viewing at least forward of the vehicle. The camera captures image data. The system includes a radar sensor disposed at the equipped vehicle and sensing at least forward of the equipped vehicle and an electronic control unit (ECU) that includes electronic circuitry and associated software. The electronic circuitry of the ECU includes at least one processor for processing image data captured by the camera and for processing sensor data captured by the radar sensor. As the equipped vehicle travels along a road, the ECU, via processing of image data captured by the camera and processing of sensor data captured by the radar sensor, determines other vehicles present on the road ahead of the equipped vehicle. The ECU, responsive to determining the presence of a plurality of other vehicles present on the road ahead of the equipped vehicle, fuses the image data captured by the camera and the sensor data captured by the radar sensor. The ECU, based on the fused data, determines a threat level for each vehicle of the plurality of other vehicles and, when the threat level for one or more vehicles of the plurality of other vehicles exceeds a threshold value, generates a braking command. The ECU transmits the braking command to a braking system of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system optionally includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
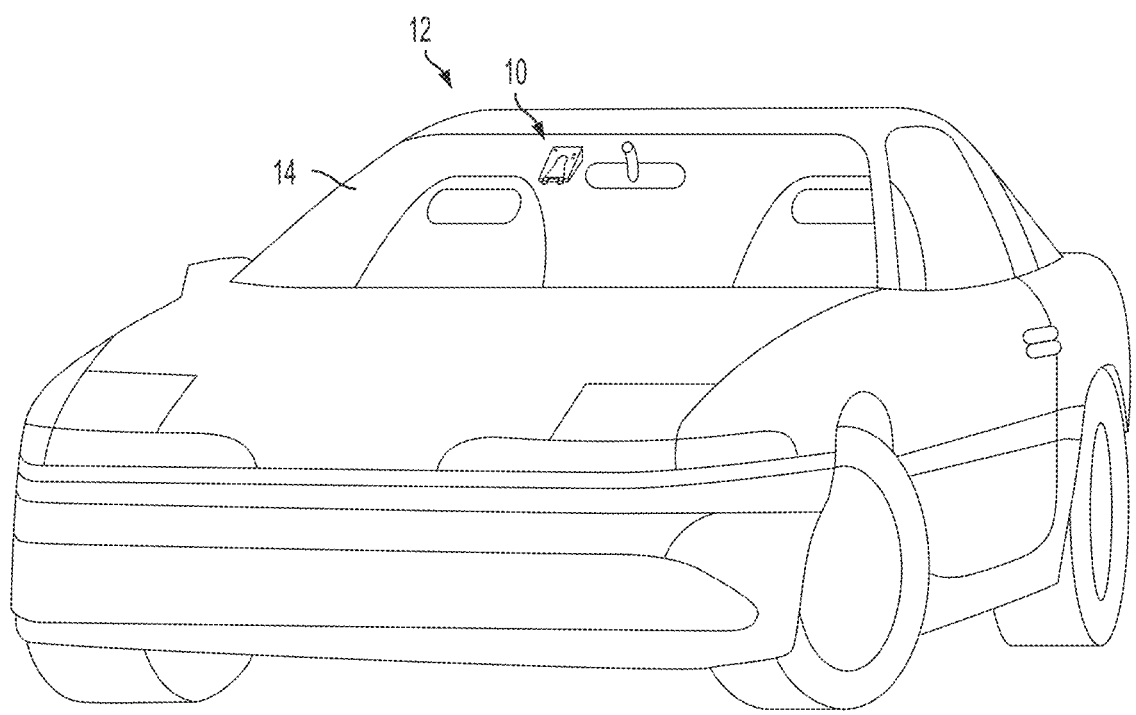
FIG. 1 is a perspective view of a vehicle with a vision system that incorporates a camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle. The system may utilize aspects of U.S. patent application Ser. No. 17/445,198, filed Aug. 17, 2021 for VEHICULAR CONTROL SYSTEM WITH TRAFFIC JAM ASSIST, and published as U.S. Publication No. US-2022-0048509, and/or Ser. No. 17/445,199, filed Aug. 17, 2021 for VEHICULAR CONTROL SYSTEM WITH ENHANCED LANE CENTERING, and published as U.S. Publication No. US-2022-0048566, which are hereby incorporated herein by reference in their entireties.

Environmental sensing forms an integral part of Advanced Driver Assistance Systems (ADAS) deployed in passenger vehicles today. Multiple environmental sensors such as forward-looking cameras and radars are typically employed to improve the accuracy and latency of information transfer. A fusion system may combine data from these sensors and provide significant information about the environment in front of vehicle (e.g., object and lane information). Object information is used primarily for longitudinal control of vehicles (e.g., braking and acceleration) in systems for development of safety features such as autonomous emergency braking (AEB) as well as comfort features like adaptive cruise control (ACC), etc. The system enables longitudinal control of a vehicle equipped with a camera and/or radar for an AEB system. The AEB system is intended to improve the safety of the driver and other occupants of the vehicle by preventing/minimizing rear-end collisions with vehicles in front of the equipped vehicle.

The camera (e.g., a forward viewing camera disposed at the front of the vehicle) includes hardware and software for capturing raw image data and sending raw data that includes information regarding multiple objects within the field of view of the camera, such as object positions, relative velocities, etc. and lane information such as lane coefficients, quality, etc. A radar module includes hardware and software that captures radar data and sends raw data that includes information pertaining to multiple objects such as object positions, relative velocities, etc. A fusion module or algorithm may fuse the information from the camera(s) and the radar to create a more accurate representation of the object data to be used by downstream components (e.g., a constant turn rate motion model based on a Kalman filter using an associative layer achieved via a nearest neighbor algorithm). A lane data processing module may be responsible for processing the raw data coming out of fusion module in a form that can be used by AEB system. A vehicle state estimator includes vehicle control modules/algorithms/sensors that provide vehicle state information such as vehicle speed, yaw rate, etc. A driver input processing module may be responsible for processing driver inputs such as button presses, voice commands, and the like, as well as accelerator/brake pedal actuation and steering wheel actuation. A threat assessment module may determine a potential of all objects forward of the vehicle and within the field of view/sensing of the camera and/or radar. The threat assessment module may assess the threat potential for each of the objects (e.g., a threat of the object colliding with the equipped vehicle).

A warning controller may be responsible for alerting the driver or other occupant through audio/visual/haptic means in the presence of a confirmed threat. For example, the system may interface with a Human-Machine interface (HMI) that receives the audio/visual/haptic alerts from the AEB controller and presents the alerts to the driver or other occupants. A vehicle brake module communicates with or includes the braking system (hardware and software) of the vehicle that applies the braking torque command to enable the ADAS feature for longitudinal control of the vehicle.

Figure 2:
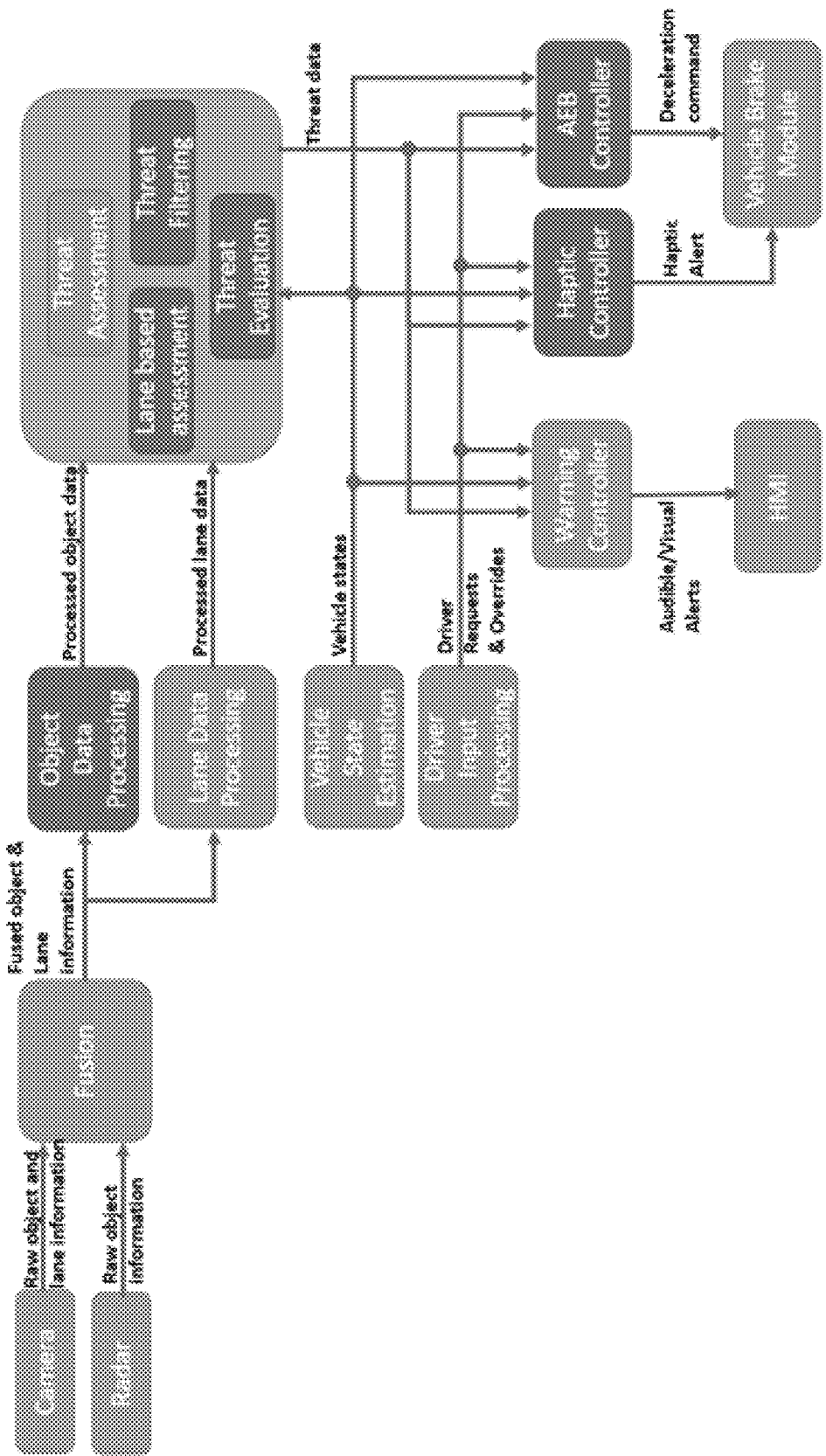
FIG. 2 is a block diagram showing elements of the autonomous emergency braking system.

Referring now to FIG. 2, the AEB system may generate a braking deceleration command (i.e., a command to apply the brakes of the vehicle) based on fusion signals from the camera data and the radar data. The system includes an object data processing module that filters the object data (from the fusion module) for disturbances as well as predicts the object position data using relevant object signals when new data is not available from the sensor system. That is, the object data processor may predict or forecast an object's position based on previous object data when the object is suddenly no longer able to be detected via the sensors. A lane-based threat assessment module may supplement the nominal threat assessment module by enforcing lane dependency, if present, on potential threats (i.e., detected objects) to minimize false detections. That is, the system may filter or otherwise reduce the threat of objects that are determined to be in a traffic lane different than the traffic lane the equipped vehicle is traveling along. For example, when the equipped vehicle is traveling along a curving road, one or more vehicles in one or more other traffic lanes may appear to be threats due to the nature of the curvature of the road. The system may filter such vehicles (or other objects) based on determined lane information (e.g., curvature of the lane and road), thus increasing the robustness of the prediction of threats and reducing false detections.

Optionally, a threat filtering module improves the robustness of the threat assessment module to sensor disturbances. The threat filtering module includes (i) an object hold filter to hold objects of interest for certain time if not detected by the sensors, (ii) an object rejection filter that rejects objects which appear for less than a threshold period of time, and (iii) an oncoming filter that applies logic reasoning to negate oncoming objects based on the overall object data received from sensors (e.g., signposts, bridges, etc.).

A threat evaluation module may be responsible for confirming threats out of all the potential threats (i.e., from the threat assessment module) using predefined metrics based on the deceleration of the equipped vehicle necessary to achieve collision avoidance (i.e., avoid collision with the detected object). A haptic controller module alerts the driver through a series of braking events that may not cause any perceivable vehicle deceleration. A closed-loop AEB longitudinal controller may be responsible for applying the correct level of safety braking to prevent the imminent collision within limits and to achieve consistent stopping distance.

Thus, implementations herein provide an autonomous emergency braking (AEB) system that longitudinally controls the vehicle to avoid collision with other vehicles and to provide maximum braking within limits specified by regulations as the equipped vehicle approaches a potential collision threat. The system includes one or more cameras that capture image data that is processed by the vehicular control system. Optionally, the camera(s) are included within a module (such as a front camera module (FCM)) that includes an image processor and ADAS feature software supporting the functionality describing above. That is, in some examples, a camera ECU locally processes the captured image data to perform automatic emergency braking functions. In other examples, the camera module includes an image processor that processes the image data and a separate ECU or processor that executes the ADAS feature software. In yet other examples, the camera module includes an image processor that processes the image data and the ADAS feature software is executed by an ECU or processor of the vehicle that is remote from the camera module.

For autonomous vehicles suitable for deployment with systems herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
    a camera disposed at a windshield of a vehicle equipped with the vehicular control system and viewing at least forward of the equipped vehicle through the windshield of the equipped vehicle, wherein the camera is operable to capture image data;
    a radar sensor disposed at the equipped vehicle and sensing at least forward of the equipped vehicle;
    an electronic control unit (ECU) comprising electronic circuitry and associated software;
    wherein the image data captured by the camera is transferred to and is processed at the ECU;
    wherein sensor data captured by the radar sensor is transferred to and is processed at the ECU;
    wherein the electronic circuitry of the ECU comprises at least one processor for processing the image data captured by the camera and for processing the sensor data captured by the radar sensor;
    wherein, as the equipped vehicle travels along a road, the vehicular control system, via processing at the ECU of the image data captured by the camera and processing at the ECU of the sensor data captured by the radar sensor, determines other vehicles present on the road ahead of the equipped vehicle;
    wherein, as the equipped vehicle travels along the road, the image data captured by the camera and the sensor data captured by the radar sensor are processed at the ECU to determine presence of a plurality of other vehicles present on the road ahead of the equipped vehicle;
    wherein the vehicular control system, based on the processing at the ECU of the image data captured by the camera and the sensor data captured by the radar sensor, determines (i) object data for each vehicle of the plurality of other vehicles and (ii) a threat level for each vehicle of the plurality of other vehicles;
    wherein an autonomous emergency braking system (AEB) of the equipped vehicle is controlled responsive to the determined threat levels;
    wherein the vehicular control system generates an alert for an occupant of the vehicle responsive to the determined threat levels; and
    wherein the vehicular control system, when a vehicle of the plurality of other vehicles is no longer detectable via processing at the ECU of the image data captured by the camera and processing at the ECU of the sensor data captured by the radar sensor, predicts a position for the no longer detectable vehicle of the plurality of other vehicles based on the determined object data of the no longer detectable vehicle of the plurality of other vehicles.

2. The vehicular control system of claim 1, wherein the vehicular control system halts predicting the position of the no longer detectable vehicle of the plurality of other vehicles after a threshold period of time.

3. The vehicular control system of claim 1, wherein the image data captured by the camera is processed for at least one of (i) pedestrian detection, (ii) headlamp control, (iii) lane marker detection and (iv) traffic sign recognition.

4. The vehicular control system of claim 1, wherein the vehicular control system determines the threat level for each vehicle of the plurality of other vehicles at least in part by confirming threats out of a plurality of potential threats using predefined metrics based on a level of deceleration of the equipped vehicle needed to avoid collision with each of the plurality of potential threats.

5. The vehicular control system of claim 1, wherein the vehicular control system determines the threat level for each vehicle of the plurality of other vehicles based at least in part on time taken by the vehicular control system to determine the presence of the respective other vehicle.

6. The vehicular control system of claim 5, wherein the vehicular control system determines a vehicle of the plurality of other vehicles is not a threat when the time taken by the vehicular control system to determine the presence of the respective vehicle is below a threshold amount of time.

7. The vehicular control system of claim 1, wherein the vehicular control system determines the threat level for each vehicle of the plurality of other vehicles based at least in part on deceleration the equipped vehicle needs to perform to avoid a potential collision.

8. The vehicular control system of claim 1, wherein the autonomous emergency braking system (AEB) of the equipped vehicle is controlled to cause the equipped vehicle to stop a threshold distance from any of the one or more vehicles of the plurality of other vehicles that exceed a threshold threat level.

9. A vehicular control system, the vehicular control system comprising:
    a camera disposed at a windshield of a vehicle equipped with the vehicular control system and viewing at least forward of the equipped vehicle through the windshield of the equipped vehicle, wherein the camera is operable to capture image data;
    a radar sensor disposed at the equipped vehicle and sensing at least forward of the equipped vehicle;
    an electronic control unit (ECU) comprising electronic circuitry and associated software;
    wherein the image data captured by the camera is transferred to and is processed at the ECU;
    wherein sensor data captured by the radar sensor is transferred to and is processed at the ECU;
    wherein the electronic circuitry of the ECU comprises at least one processor for processing the image data captured by the camera and for processing the sensor data captured by the radar sensor;
    wherein, as the equipped vehicle travels along a road, the vehicular control system, via processing at the ECU of the image data captured by the camera and processing at the ECU of the sensor data captured by the radar sensor, determines other vehicles present on the road ahead of the equipped vehicle;
    wherein, as the equipped vehicle travels along the road, the image data captured by the camera and the sensor data captured by the radar sensor are processed at the ECU to determine presence of a plurality of other vehicles present on the road ahead of the equipped vehicle;

wherein the vehicular control system, based on the processing at the ECU of the image data captured by the camera and the sensor data captured by the radar sensor, determines (i) object data for each vehicle of the plurality of other vehicles and (ii) a threat level for each vehicle of the plurality of other vehicles;

wherein an autonomous emergency braking system (AEB) of the equipped vehicle is controlled responsive to the determined threat levels;

wherein the vehicular control system, when a vehicle of the plurality of other vehicles is no longer detectable via processing at the ECU of the image data captured by the camera and processing at the ECU of the sensor data captured by the radar sensor, predicts a position for the no longer detectable vehicle of the plurality of other vehicles based on the determined object data of the no longer detectable vehicle of the plurality of other vehicles; and wherein the vehicular control system halts predicting the position of the no longer detectable vehicle of the plurality of other vehicles after a threshold period of time.

10. The vehicular control system of claim 9, wherein the vehicular control system determines the threat level for each vehicle of the plurality of other vehicles based on a level of deceleration of the equipped vehicle needed to avoid collision with each vehicle of the plurality of other vehicles.

11. The vehicular control system of claim 9, wherein the image data captured by the camera is processed for at least one of (i) pedestrian detection, (ii) headlamp control, (iii) lane marker detection and (iv) traffic sign recognition.

12. The vehicular control system of claim 9, wherein the vehicular control system determines the threat level for each vehicle of the plurality of other vehicles based at least in part on time taken by the vehicular control system to determine the presence of the respective other vehicle.

13. The vehicular control system of claim 12, wherein the vehicular control system determines a vehicle of the plurality of other vehicles is not a threat when the time taken by the vehicular control system to determine the presence of the respective vehicle is below a threshold amount of time.

14. The vehicular control system of claim 9, wherein the autonomous emergency braking system (AEB) of the equipped vehicle is controlled to cause the equipped vehicle to stop a threshold distance from any of one or more vehicles of the plurality of other vehicles that exceed a threshold threat level.

15. A vehicular control system, the vehicular control system comprising:

a camera disposed at a windshield of a vehicle equipped with the vehicular control system and viewing at least forward of the equipped vehicle through the windshield of the equipped vehicle, wherein the camera is operable to capture image data;

a radar sensor disposed at the equipped vehicle and sensing at least forward of the equipped vehicle;

an electronic control unit (ECU) comprising electronic circuitry and associated software;

wherein the image data captured by the camera is transferred to and is processed at the ECU;

wherein sensor data captured by the radar sensor is transferred to and is processed at the ECU;

wherein the electronic circuitry of the ECU comprises at least one processor for processing the image data captured by the camera and for processing the sensor data captured by the radar sensor;

wherein, as the equipped vehicle travels along a road, the vehicular control system, via processing at the ECU of the image data captured by the camera and processing at the ECU of the sensor data captured by the radar sensor, determines other vehicles present on the road ahead of the equipped vehicle;

wherein, as the equipped vehicle travels along the road, the image data captured by the camera and the sensor data captured by the radar sensor are processed at the ECU to determine presence of a plurality of other vehicles present on the road ahead of the equipped vehicle;

wherein the vehicular control system, based on the processing at the ECU of the image data captured by the camera and the sensor data captured by the radar sensor, determines (i) object data for each vehicle of the plurality of other vehicles and (ii) a threat level for each vehicle of the plurality of other vehicles;

wherein the vehicular control system determines the threat level for each vehicle of the plurality of other vehicles based at least in part on deceleration the equipped vehicle needs to perform to avoid a potential collision with each vehicle of the plurality of other vehicles;

wherein an autonomous emergency braking system (AEB) of the equipped vehicle is controlled responsive to the determined threat levels; and wherein the vehicular control system, when a vehicle of the plurality of other vehicles is no longer detectable via processing at the ECU of the image data captured by the camera and processing at the ECU of the sensor data captured by the radar sensor, predicts a position for the no longer detectable vehicle of the plurality of other vehicles based on the determined object data of the no longer detectable vehicle of the plurality of other vehicles.

16. The vehicular control system of claim 15, wherein the vehicular control system halts predicting the position of the no longer detectable vehicle of the plurality of other vehicles after a threshold period of time.

17. The vehicular control system of claim 15, wherein the image data captured by the camera is processed for at least one of (i) pedestrian detection, (ii) headlamp control, (iii) lane marker detection and (iv) traffic sign recognition.

18. The vehicular control system of claim 15, wherein the vehicular control system determines the threat level for each vehicle of the plurality of other vehicles based at least in part on time taken by the vehicular control system to determine the presence of the respective other vehicle.

19. The vehicular control system of claim 15, wherein the vehicular control system determines a vehicle of the plurality of other vehicles is not a threat when time taken by the vehicular control system to determine the presence of the respective vehicle is below a threshold amount of time.

20. The vehicular control system of claim 15, wherein the autonomous emergency braking system (AEB) of the equipped vehicle is controlled to cause the equipped vehicle to stop a threshold distance from any of the one or more vehicles of the plurality of other vehicles that exceed a threshold threat level.

* * * * *

UNITED STATES PATENT AND TRADEMARK OFFICE
CERTIFICATE OF CORRECTION

PATENT NO. : 12,286,154 B2
APPLICATION NO. : 18/641667
DATED : April 29, 2025
INVENTOR(S) : Venkata Satya Siva Prasad Challa et al.

It is certified that error appears in the above-identified patent and that said Letters Patent is hereby corrected as shown below:

In the Claims

<u>Column 8</u>
Claim 8, Line 38, "any of the one or more" should be --any of one or more--

<u>Column 10</u>
Claim 20, Line 62, "any of the one or more" should be --any of one or more--

Signed and Sealed this
Twenty-seventh Day of May, 2025

Coke Morgan Stewart
*Acting Director of the United States Patent and Trademark Office*